(12) United States Patent
Law

(10) Patent No.: US 8,198,860 B2
(45) Date of Patent: Jun. 12, 2012

(54) CHARGER WITH ANALYZER ARRANGEMENT

(75) Inventor: King Yiu Law, Hong Kong (HK)

(73) Assignee: DACA Electronics Company Limited, Cheung Sha Wan, Kowloon (HK)

( * ) Notice: Subject to any disclaimer, the term of this patent is extended or adjusted under 35 U.S.C. 154(b) by 317 days.

(21) Appl. No.: 12/700,732

(22) Filed: Feb. 5, 2010

(65) Prior Publication Data

US 2011/0193523 A1   Aug. 11, 2011

(51) Int. Cl.
*H02J 7/00* (2006.01)
(52) U.S. Cl. .................................. 320/113; 320/115
(58) Field of Classification Search .................. 320/113, 320/115
See application file for complete search history.

(56) References Cited

U.S. PATENT DOCUMENTS

| 4,288,733 | A  | * | 9/1981 | Bilanceri et al. | 320/113 |
| 6,992,487 | B1 | * | 1/2006 | Steinke | 324/426 |
| 2009/0140697 | A1 | * | 6/2009 | Hurley et al. | 320/139 |

* cited by examiner

*Primary Examiner* — M'Baye Diao
(74) *Attorney, Agent, or Firm* — Tsz Lung Yeung

(57) ABSTRACT

A charger includes a charger base, a charging circuitry, and an analyzer arrangement. The charger base includes at least one charging platform defining a receiving cavity. The analyzer arrangement includes an analyzing circuitry and an analyzer connector. The analyzer connector is provided on the charger base for electrically connecting the battery discharging terminals with the analyzing circuitry, wherein the charger is arranged to operate in at least one of a charger mode and an analyzer mode. In the charger mode, the rechargeable battery is arranged to insert in the receiving cavity in for charging the rechargeable by the charging circuitry. In the analyzer mode, the rechargeable battery is arranged to insert into the receiving cavity while the analyzer connector is extended from the charger base to electrically contact with the battery discharging terminals for allowing the rechargeable battery to be discharged and tested by the analyzing circuitry.

25 Claims, 13 Drawing Sheets

CHARGER WITH ANALYZER ARRANGEMENT

BACKGROUND OF THE PRESENT INVENTION

1. Field of Invention

The present invention relates to a charger, and more particularly to a charger comprising an analyzer arrangement which allows the charger to operate between a charger mode and an analyzer mode.

2. Description of Related Arts

As shown in FIG. 1 of the drawings, a conventional analyzer, such as an analyzer for testing a rechargeable battery 100P of a radio communication device 800P (as shown in FIG. 2), mainly comprises an analyzer housing 10P having a plurality of battery platforms 11P indently formed thereon, an analyzing circuitry provided in the analyzer housing 10P. The analyzer housing 10P usually comprises a plurality of electrical terminals 111P provided on a corresponding position of each of the battery platforms 11P such that when the rechargeable battery 100P is inserted into one of the battery platforms 11P, discharging terminals of the rechargeable battery 100P is arranged to be aligned and in contact with the corresponding electrical terminals 111P of the analyzer so as to allow the discharging and testing of the rechargeable battery 100P through the electrical terminals 111P and the discharging terminals.

As a matter of conventional arts, a rechargeable battery 100P, such as the rechargeable battery 100P for a radio communication device 800P, comprises of two set of terminals. One set of the terminals is the set of discharging terminals mentioned above. The discharging terminals primarily concern with facilitating discharging and testing of the rechargeable battery by an analyzer. The other set of terminals is a set of recharging terminals 102P for facilitating recharging of the rechargeable battery through a conventional charger. The severance of the position of the discharging terminals and the recharging terminals 102P are primarily for safety reason.

A major disadvantage for a conventional analyzer described above is that it is primarily for professional use. While discharging and testing of a rechargeable battery 100P may prolong the general life span of it, an analyzer is usually very expensive and is not suitable for widespread use. Generally speaking, only larger organizations which need to use many radio communication devices 800P, such as a hospitals, schools, etc., will be equipped with such an expensive piece of equipment.

For the majority of users of radio communication devices 800P, they usually have a charger 20P for recharging the rechargeable battery 100P. However, conventional chargers do not perform discharging of the rechargeable batteries 100P and incapable of testing the condition of those batteries 100P. When the rechargeable battery 100P is recharged in such a manner, the general life span of the rechargeable battery 100P is substantially limited.

Referring to FIG. 2A and FIG. 2B of the drawings, a conventional charger 20P for charging a rechargeable battery 100P of a radio communication device 800P usually comprises a charger housing 21P, a charging slot 22P indently formed on the charger housing 21P, and a charging circuitry 23P for charging the rechargeable battery 100P. On the other hand, the radio communication device 800P comprises a main unit 801P and the rechargeable battery 100P attached at a rear portion of the main unit 801P. As shown in FIG. 2A of the drawings, when the rechargeable battery 100P needs recharging, the rechargeable battery 100P needs not detach from the radio communication device 800P. In other words, the radio communication device 800P and the rechargeable battery 100P are both inserted into the charging slot 22P for being recharged.

When a user of the radio communication device 800P wants to recharge and periodically discharge the rechargeable battery 100P (because discharging and testing of the rechargeable battery 100P needs not be performed too frequently), he or she has to buy a charger 20P and an analyzer 10P separately. Given the disadvantages of a conventional analyzer 10P (as described above), the user is thereby discouraged from buying and using the analyzer 10P.

Furthermore, from a technical point of view, the recharging terminals 102P are provided at an outer side of rechargeable battery 100P, while the discharging terminals are provided at an inner side of the rechargeable battery 100P. As a result, when the user needs to discharge (which is less frequently required), he or she has to detach the rechargeable battery 100P from the main unit 801P of the radio communication device 800P. In the ordinary course of events, however, the user needs only to recharge the rechargeable battery 100P by attaching the rechargeable battery 100P onto the main unit 801P and insert the main unit 801P as well as the rechargeable battery 100P into the charging slot 22P. This procedure possesses a great deal of inconvenience for users using both the charger 20P and the analyzer 10P.

SUMMARY OF THE PRESENT INVENTION

A main object of the present invention is to provide a charger comprising an analyzer arrangement which allows the charger to operate between a charger mode and an analyzer mode. In other words, a user is able to conveniently recharge or discharge a rechargeable battery of an electrical device, such as a radio communication device, by using a single charger of the present invention.

Another object of the present invention is to provide a charger comprising an analyzer arrangement which allows a user to recharge or test the condition of a wide range of rechargeable batteries without individually purchasing chargers and analyzers for each kind of rechargeable batteries. In other words, the charger of the present invention is universal in the sense that it is capable of recharging and testing many different types of recharging batteries.

Another object of the present invention is to provide a charger comprising an analyzer arrangement which resolves the technical difficulty arising from opposed positions of recharging terminals and discharging terminals distributed on a typical rechargeable battery.

Another object of the present invention is to provide a charger comprising an analyzer arrangement which allows analyzing function to be incorporated into a charger. As a result, analyzers no longer serve only professional uses and this will allow the present invention to be sold at substantially lower price than a conventional analyzer, yet users of the present invention enjoys the benefits of having an enhanced general life span of the rechargeable battery.

Accordingly, in order to accomplish the above objects, the present invention provides a charger for charging a rechargeable battery having a plurality of battery charging terminals and battery discharging terminals spacedly provided at predetermined positions on the rechargeable battery, wherein the charger comprises:

a charger base which comprises at least one charging platform defining a receiving cavity indently formed thereon for the rechargeable battery to dispose in the receiving cavity, and comprising a plurality of charger charging terminals provided at positions corresponding to the battery charging terminals respectively when the rechargeable battery is disposed in the receiving cavity;

a charging circuitry received in the charger base and electrically connected with the charger charging terminals; and an analyzer arrangement, which comprises an analyzing circuitry received in the charger base; and an analyzer connector provided on the charger base for electrically connecting the battery discharging terminals with the analyzing circuitry, wherein the charger is arranged to operate in at least one of a charger mode and an analyzer mode, wherein in the charger mode, the rechargeable battery is arranged to insert in the receiving cavity in such a manner that the battery charging terminals are aligned and electrically contacted with the charger charging terminals respectively for charging the rechargeable battery by the charging circuitry, wherein in the analyzer mode, the rechargeable battery is arranged to insert into the receiving cavity while the analyzer connector is extended from the charger base to electrically contact with the battery discharging terminals for allowing the rechargeable battery to be discharged and analyzed by the analyzing circuitry.

The above mentioned objectives, features, and advantages of the present invention will be more clearly described and shown in the following detailed description, drawings, and the claims.

DETAILED DESCRIPTION OF THE PREFERRED EMBODIMENT

Figure 1:
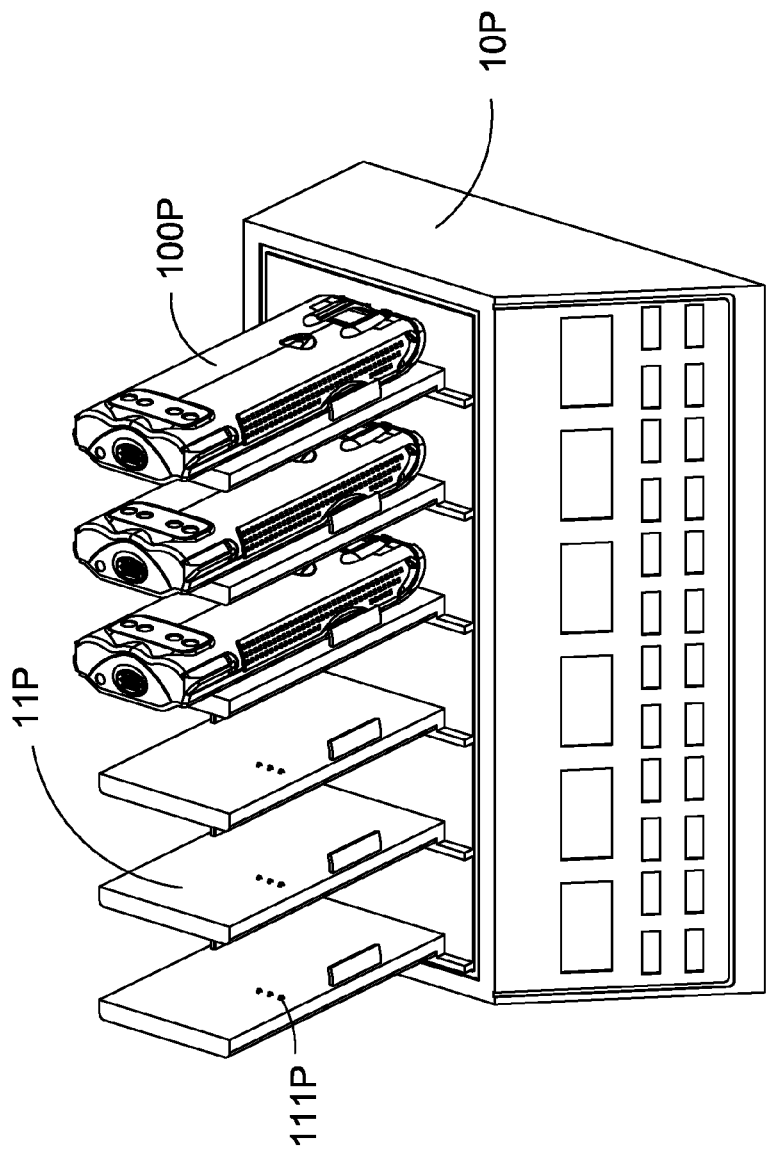
FIG. 1 is a perspective view of a conventional analyzer.
Figure 2A:
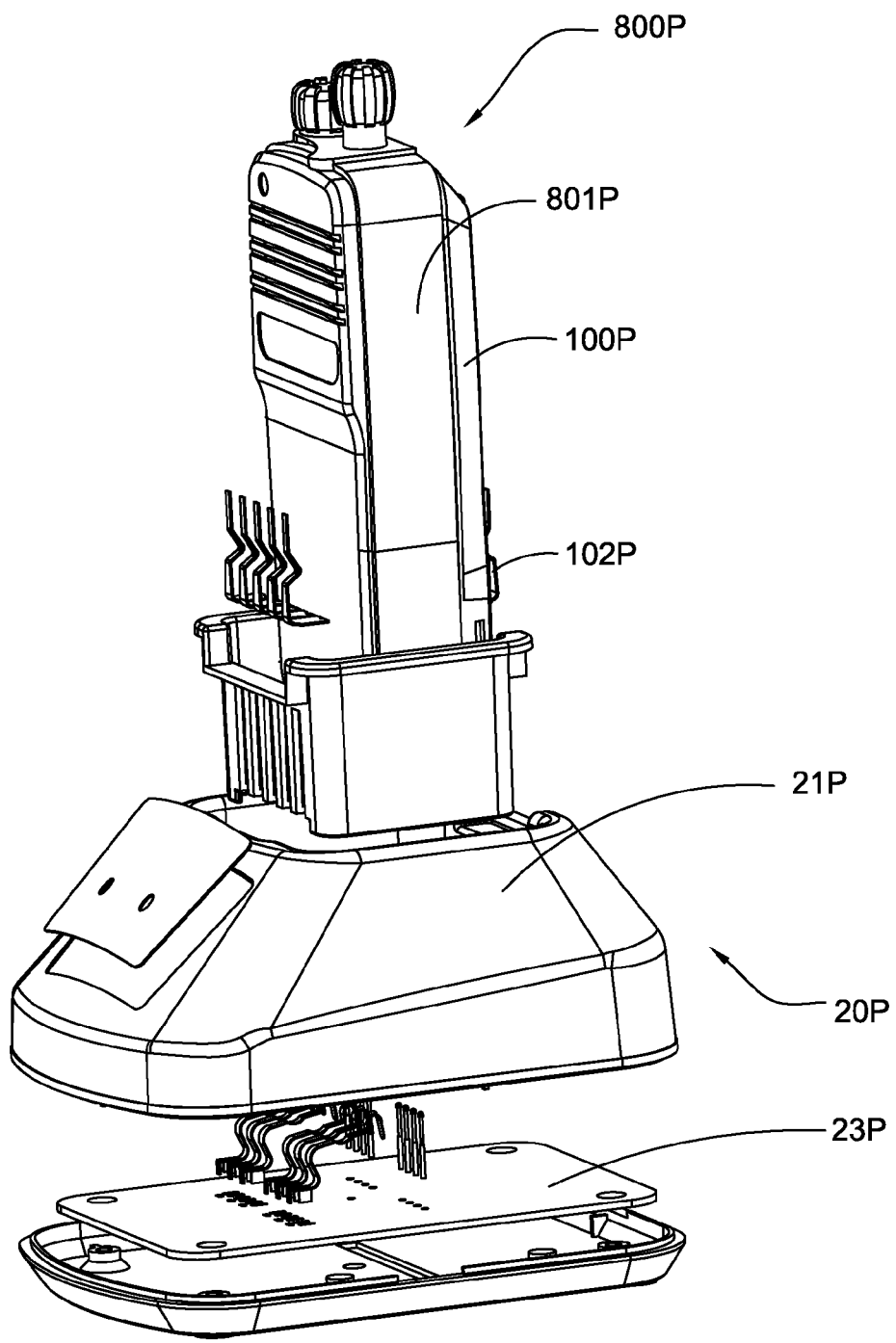
FIG. 2A and FIG. 2B are perspective views of a conventional charger for a radio communication device with a rechargeable battery.
Figure 2B:
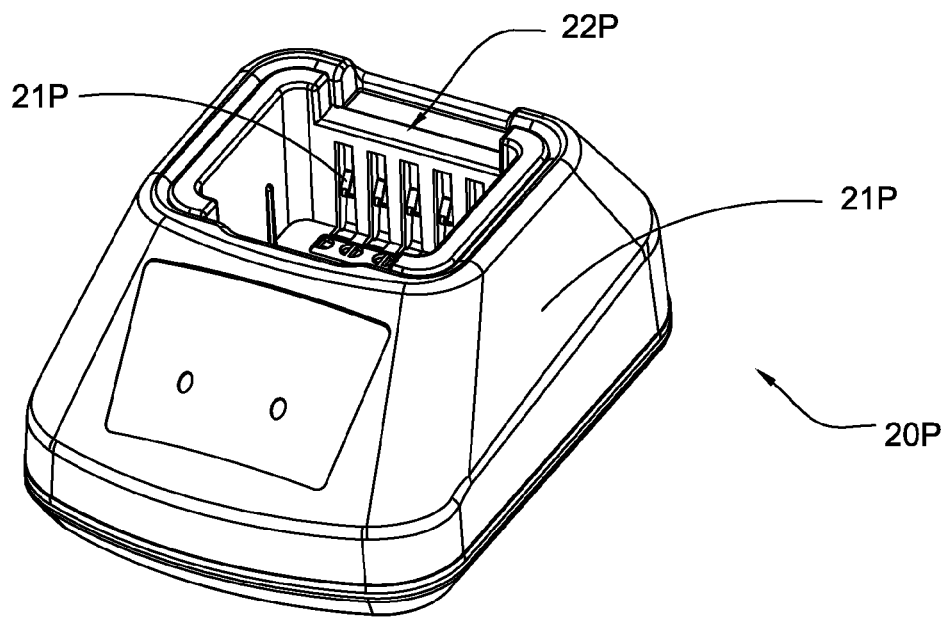

Referring to FIG. 3A, FIG. 3B, FIG. 4 to FIG. 10 of the drawings, a charger for charging at least one rechargeable battery 1 having a plurality of battery charging terminals 2 and battery discharging terminals 3 spacedly provided at predetermined positions on the rechargeable battery 1 is illustrated. The charger according to the preferred embodiment of the present invention comprises a charger base 10, a charging circuitry 20, and an analyzer arrangement 30. The rechargeable battery 1 is for an electrical appliance, preferably a radio communication device 70 which is capable of communicating with another radio communication device 70 through a predetermined radio frequency.

According to the preferred embodiment of the present invention, the charger is for use in conjunction with a rechargeable battery 1 where the battery charging terminals 2 and the battery discharging terminals 3 are spacedly provided at two different (and normally opposed) sides of the rechargeable battery 1. Preferably, the rechargeable battery 1 is normally attached to the radio communication device 70 in a side-by-side manner wherein the battery charging terminals 2 are provided at a charging side of the rechargeable battery 1 which is defined as the side opposed to the radio communication device 70 when the rechargeable battery 1 is attached onto it. On the other hand, the battery discharging terminals 3 are spacedly provided at an discharging side of the rechargeable battery 1 which is defined at the side which is in contact with the radio communication device 70 when it is attached thereon.

The charger base 10 comprises a plurality (but at least one) of charging platforms 11 each defining a receiving cavity 111 indently formed thereon for the rechargeable battery 1 to dispose in the receiving cavity 111. Each of the charging platforms 11 comprises a plurality of charger charging terminals 112 provided at positions corresponding to the battery charging terminals 2 respectively when the rechargeable battery 1 is properly disposed in the receiving cavity 111. On the other hand, the charging circuitry 20 is received in the charger base 10 and is electrically connected with the charger charging terminals 112 so that when rechargeable battery 1 is properly disclosed in the receiving cavity 111, the charging circuitry 20 is arranged to recharge the rechargeable battery 1 through the charger charging terminals 112 and the battery charging terminals 2.

Figure 7:
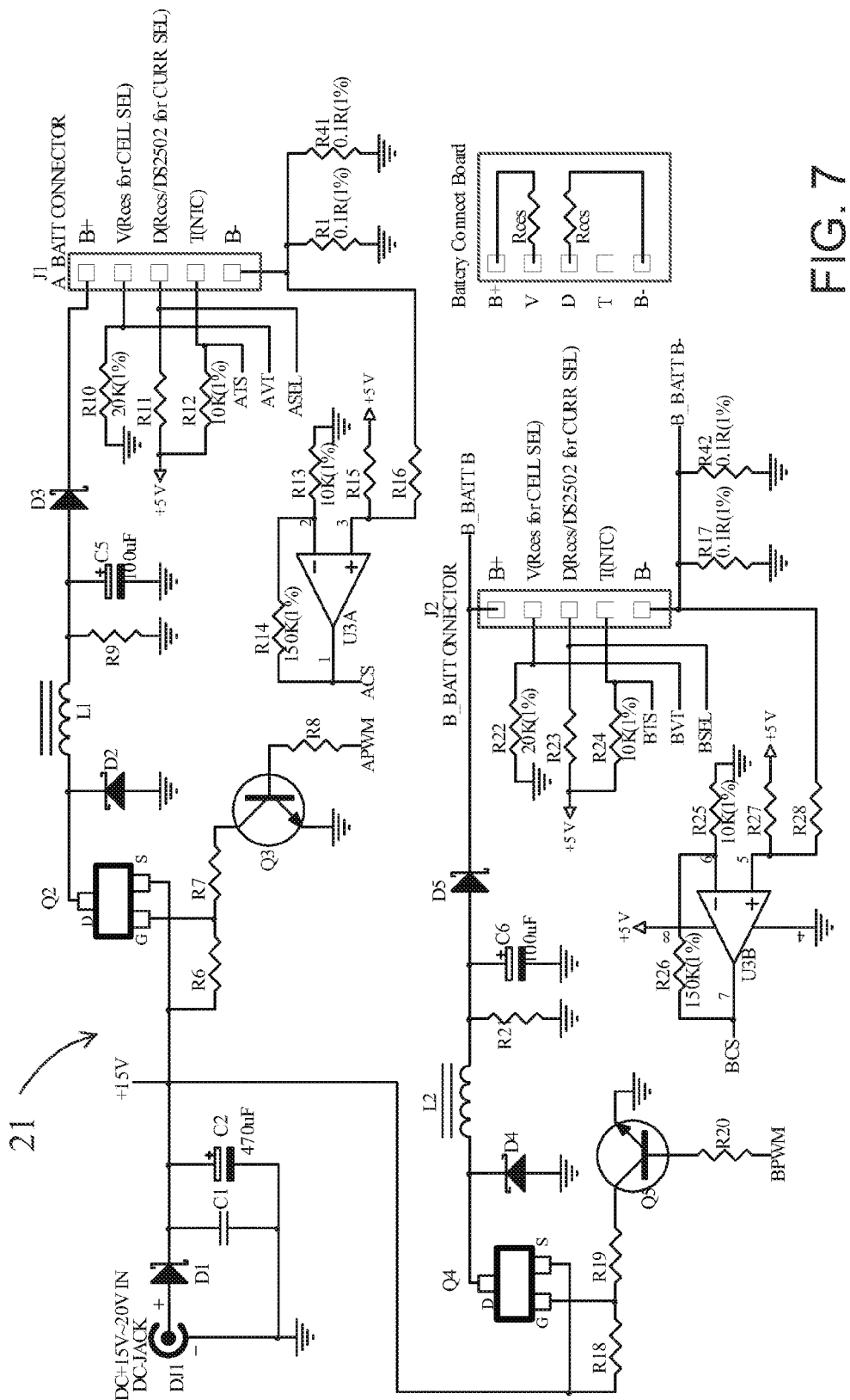
FIG. 7 is a circuit diagram of the recharging sub-circuitry of the charger according to the preferred embodiment of the present invention.
Figure 8:
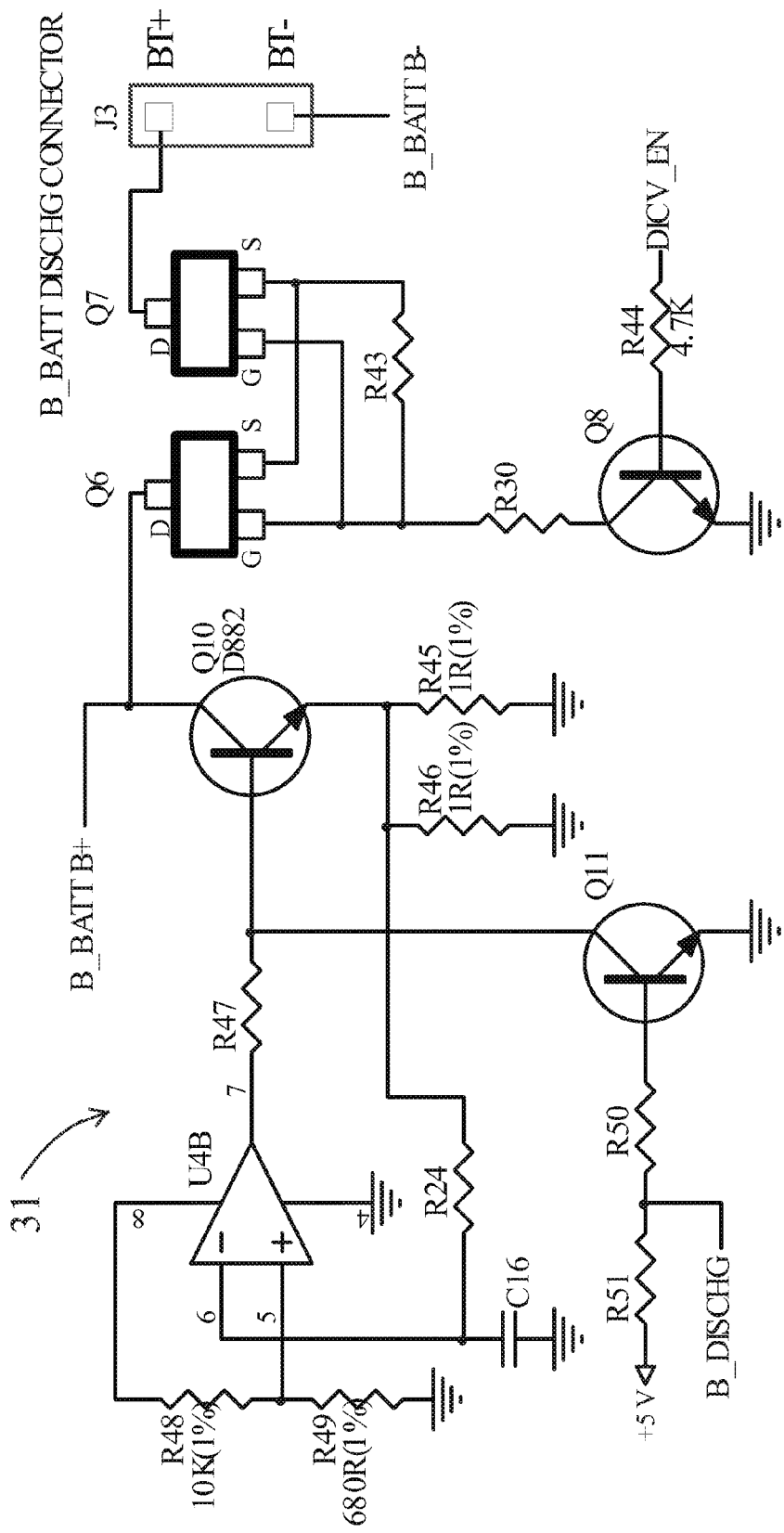
FIG. 8 is a circuit diagram of the analyzing circuitry of the charger according to the preferred embodiment of the present invention.
Figure 9:
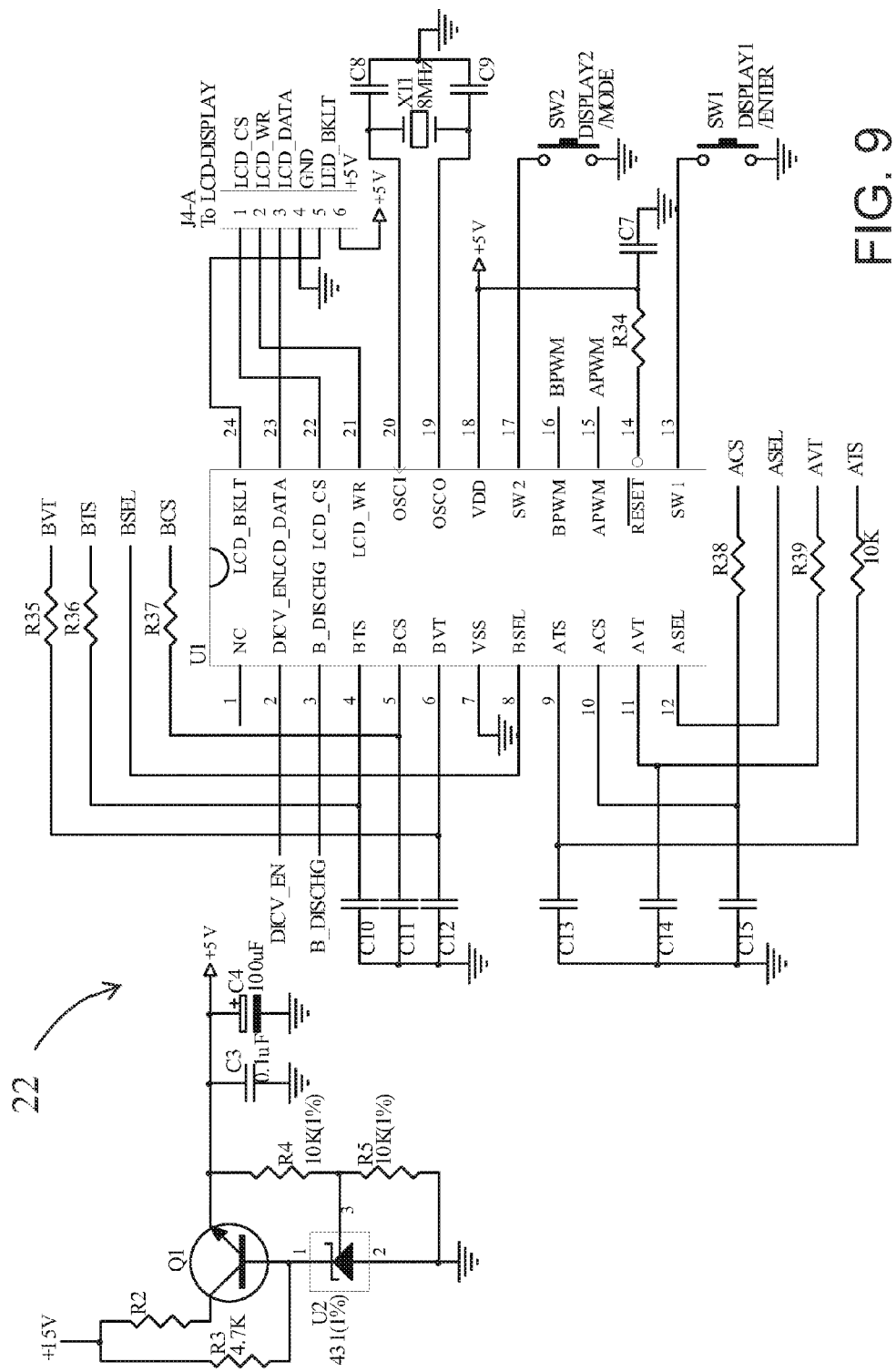
FIG. 9 is a circuit diagram of the control sub-circuitry of the charger according to the preferred embodiment of the present invention.
Figure 10:
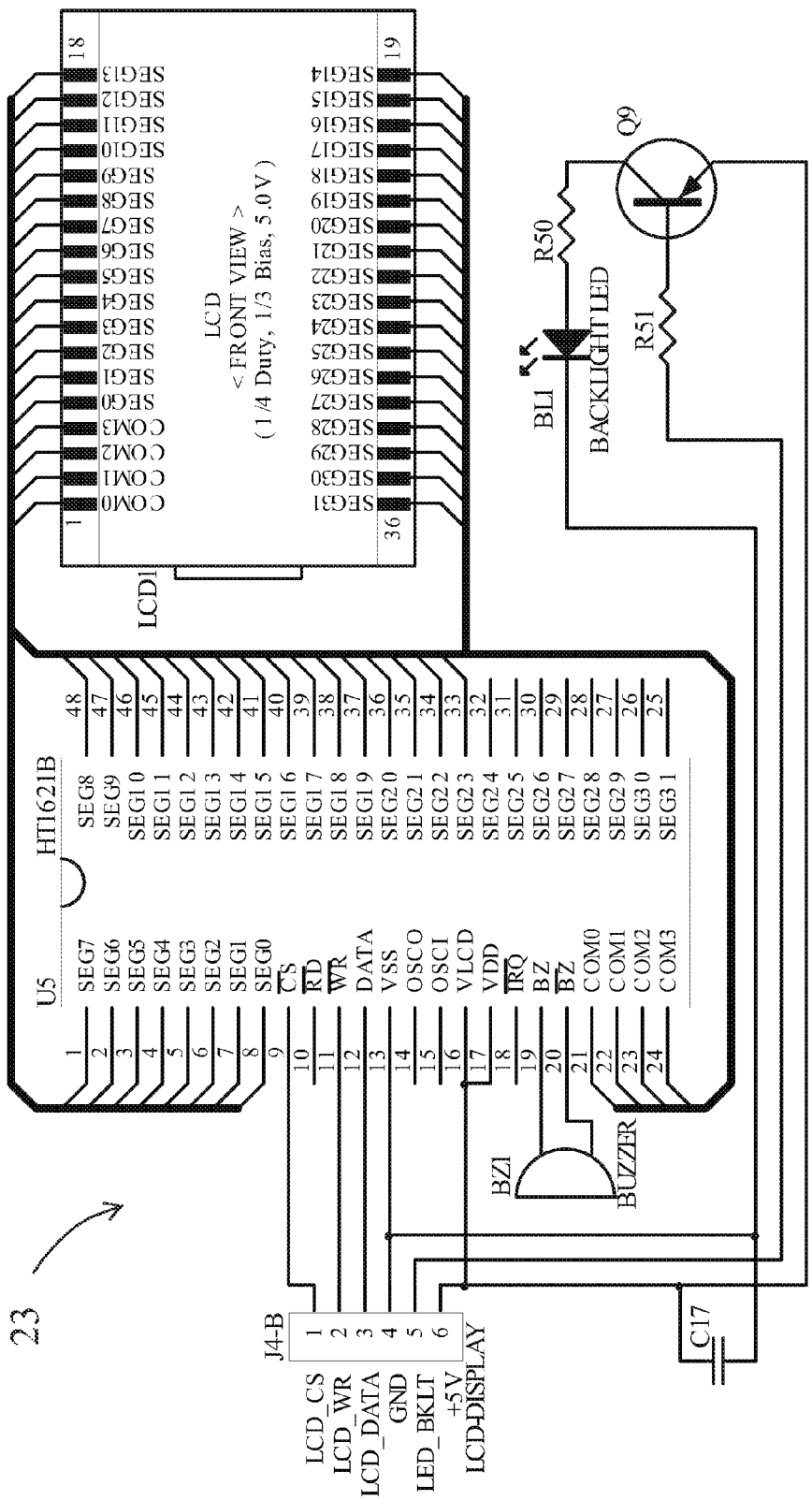
FIG. 10 is a circuit diagram of the display sub-circuitry of the charger according to the preferred embodiment of the present invention.

The charging circuitry 20 comprises a recharging sub-circuitry 21 (as shown in FIG. 7), a control sub-circuitry 22 (as shown in FIG. 9), and a display sub-circuitry 23 (as shown in FIG. 10) received in the charger base 10 for recharging the rechargeable battery 1 and controlling an operation thereof. On the other hand, the analyzer arrangement 30 comprises an analyzing circuitry 31 (as shown in FIG. 8) and a plurality (but at least one) of analyzer connectors 32. The analyzing circuitry 31 is received in the charger base 10 and is arranged to control discharging and analyzing of the rechargeable battery 1.

The charging circuitry 20 and the analyzing circuitry 31 are preferably embodied in one single Printed Circuit Board (PCB). However, two different PCBs accommodating the two different circuits (the charging circuitry 20 and the analyzing circuitry 31) are also feasible. The control sub-circuitry 22 can also be arranged to coordinate the analyzing function of the analyzing circuitry 31.

Each of the analyzer connectors 32 is provided on the charger base 10 for electrically connecting the battery discharging terminals 3 with the analyzing circuitry 31, wherein each of the charging platforms 11 is arranged to operate in at least a charger mode and an analyzer mode, wherein in the charger mode, at least one of the rechargeable battery 1 is arranged to insert in the receiving cavity 111 in such a manner that the battery charging terminals 2 are aligned and electrically contacted with the charger charging terminals 111 respectively for charging the rechargeable battery 1 by the charging circuitry 20, wherein in the analyzer mode, the corresponding rechargeable battery 1 is arranged to partially insert into the receiving cavity 111 while the analyzer connector 32 is extended from the charger base 10 to electrically contact with the battery discharging terminals 3 for allowing the rechargeable battery 1 to be discharged and analyzed by the analyzing circuitry 31. Thus, when the charger embodies only one charging platform 11, it can only operate between the charger mode and the analyzer mode. However, when the charger embodies more than one charging platform 11, each of the charging platforms 11 can independently operate in the charger mode or the analyzer mode. For example, the first charging platform 11 may operate in the charger mode for recharging a rechargeable battery 1, while the second charging platform 12 may operate in the analyzer mode for discharging and testing another rechargeable battery 1.

The charger further comprises a power connection device 40 extended from the charger base 10 to electrically connect with an external power source, such as a external AC power source, for acquiring external power for charging or analyzing at least one of the rechargeable batteries 1.

According to the preferred embodiment of the present invention, the charger base 10 has an elongated structure accommodating a plurality of charging platforms 11. More specifically, the charger base 10 further has a correspondingly elongated accommodating slot 12 transversely and indently formed on the charger base 10. Each of the charging platforms 11 further comprises a plurality of receiving racks 113 provided on the accommodating slot 12 of the charger base 10 in a side-by-side manner, wherein each of the receiving racks 113 defines one of the receiving cavities 111 of the charger base 10 for accommodating the rechargeable battery 1. The charger charging terminals 112 are provided on a predetermined position on a sidewall of the corresponding receiving cavity 111 of the corresponding receiving rack 113 and aligned with the battery charging terminals 2 of the rechargeable battery 1. In practice, more than one rechargeable battery 1 are simultaneously disposed in the receiving racks 113 for individually charging or analyzing those rechargeable batteries 1.

Each of the receiving cavities 111 is shaped and sized to fittedly receive the rechargeable battery 1 which is attached onto the radio communication device 70 so that the rechargeable battery 1 and the radio communication device 70 are allowed to receive into the relevant receiving cavity 111 and held by the corresponding receiving rack 113 when it is in the charger mode. As such, the charger of the present invention allows the user to conveniently recharge the rechargeable battery 1 by simply inserting the radio communication device 70 and the rechargeable battery 1 which has already been attached on to the radio communication device 70 into one of the receiving racks 113.

The charging circuitry 20 is received in the charger base 10 and is electrically connected with the charger charging terminals 112 of each of the charging platforms 11 so that when at least one rechargeable battery 1 is properly inserted into one of the receiving racks 113, the charging circuitry 20 is arranged to recharge the rechargeable battery 1. When more than one rechargeable battery 1 are inserted into the respective receiving racks 113, the charging circuitry 20 is arranged to simultaneously recharge all of the properly disposed rechargeable batteries 1.

Moreover, the charger further comprises a temperature detector 60 provided at one of the charger charging terminals 112 for detecting the temperature of the corresponding rechargeable battery 1 when it is being recharged by the charger. More specifically, the temperature detector 60 is formed as one of the charging terminals 112 and is electrically connected to the charging circuitry 20, wherein the temperature detector 60 is arranged to have physical contact with one of the battery discharging terminals 3 of the rechargeable battery 1 while the corresponding physical response is transmitted to the charging circuitry 20 through for interpreting a temperature of the rechargeable battery 1.

Each of the analyzer connectors 32 comprises a connector frame 321 detachably coupled with a predetermined portion of the corresponding rechargeable battery 1, and a plurality of (but at least one) extension cables 322 extended from the charger base 10 to connect with the corresponding connector frame 321.

Figure 3A:
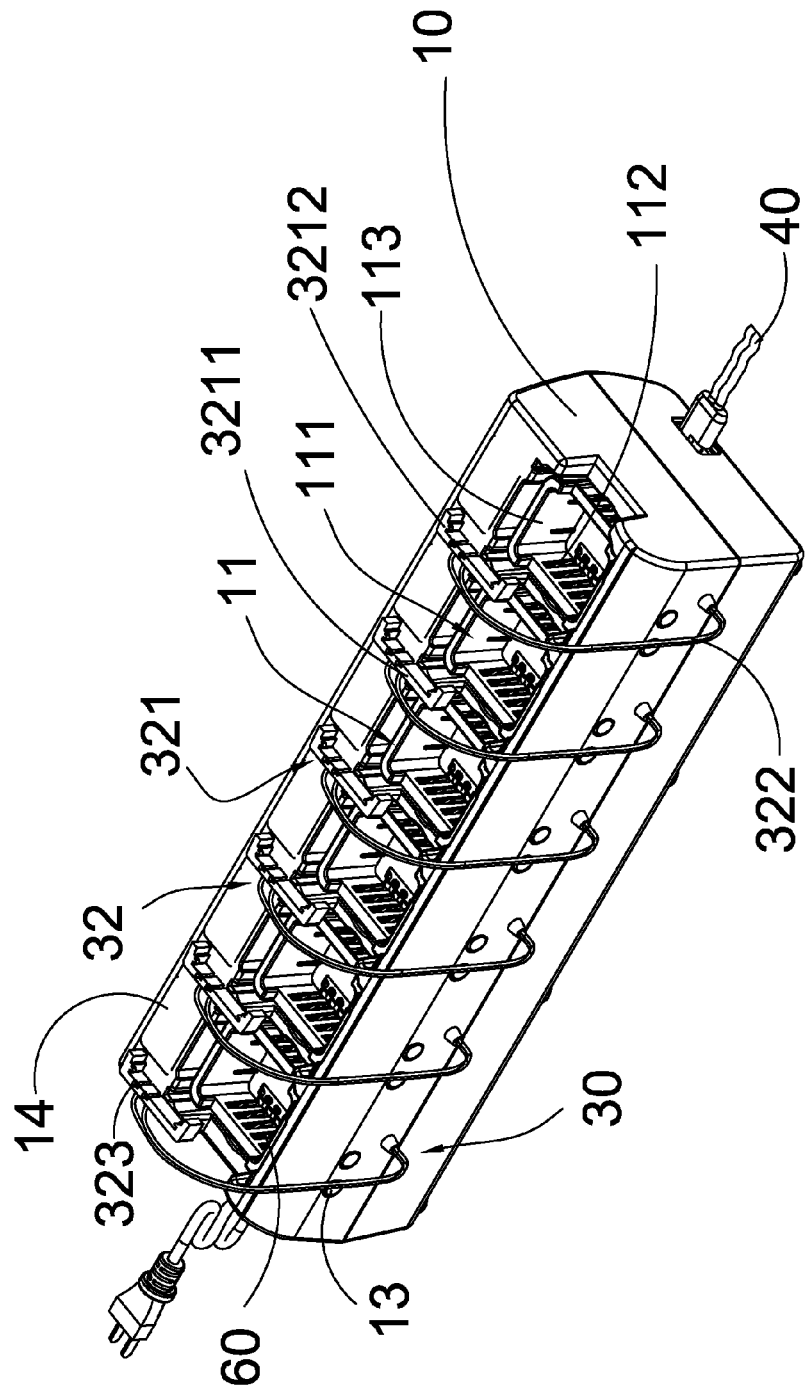
FIG. 3A and FIG. 3B are perspective views of a charger having an analyzer arrangement according to a preferred embodiment of the present invention.
Figure 3B:
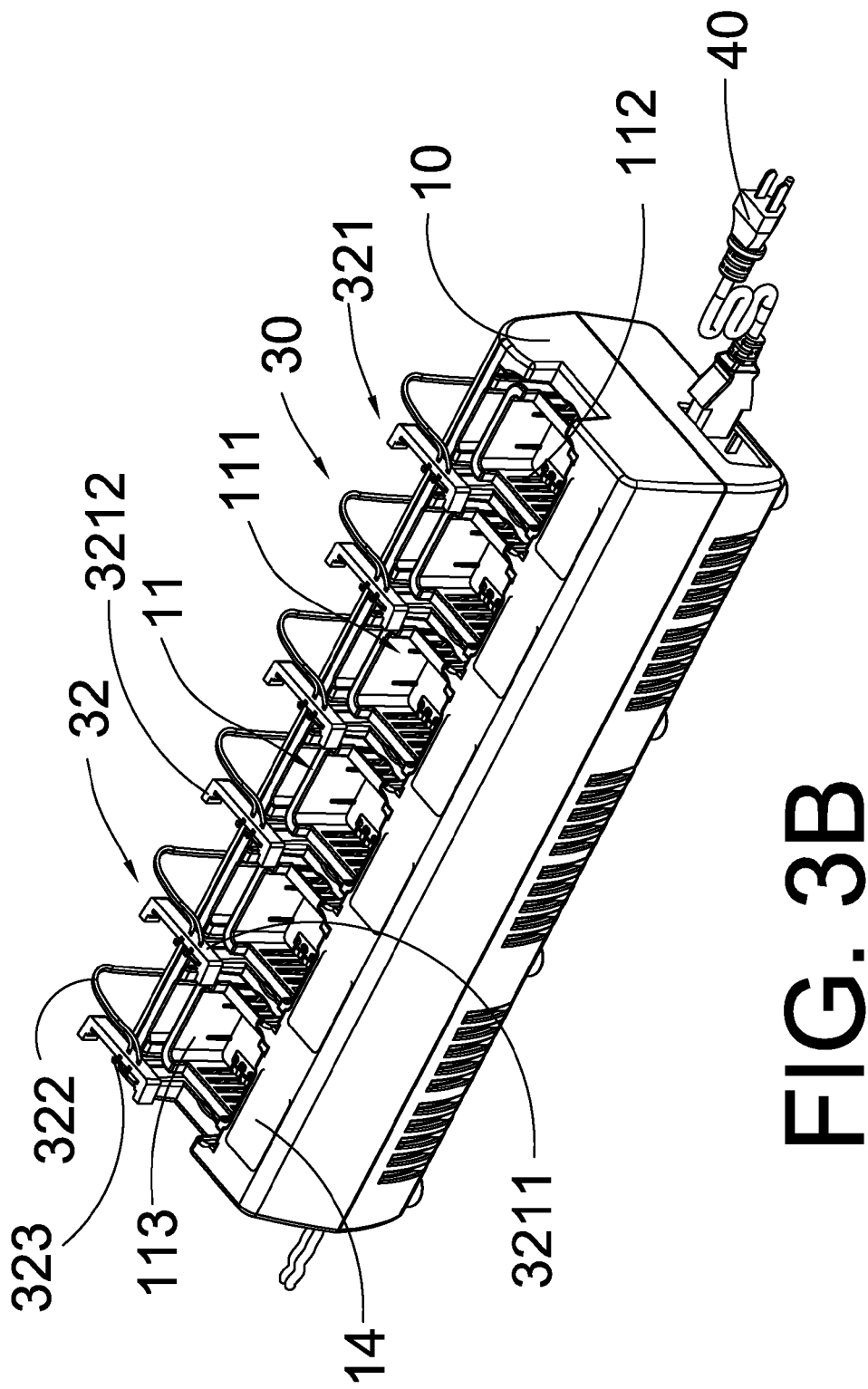
Figure 4:
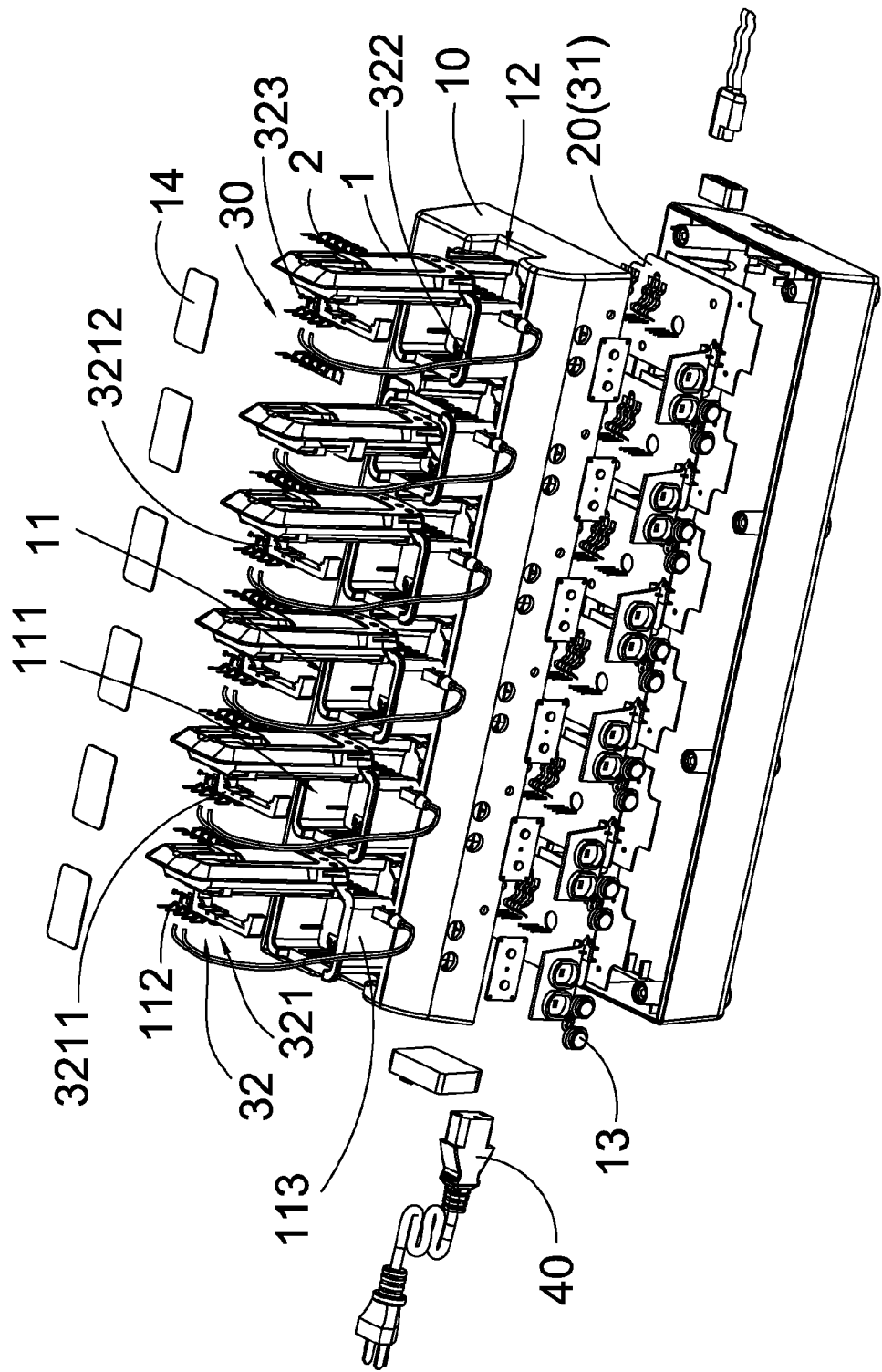
FIG. 4 is an exploded perspective view of the charger having the analyzer arrangement according to the preferred embodiment of the present invention.
Figure 5:
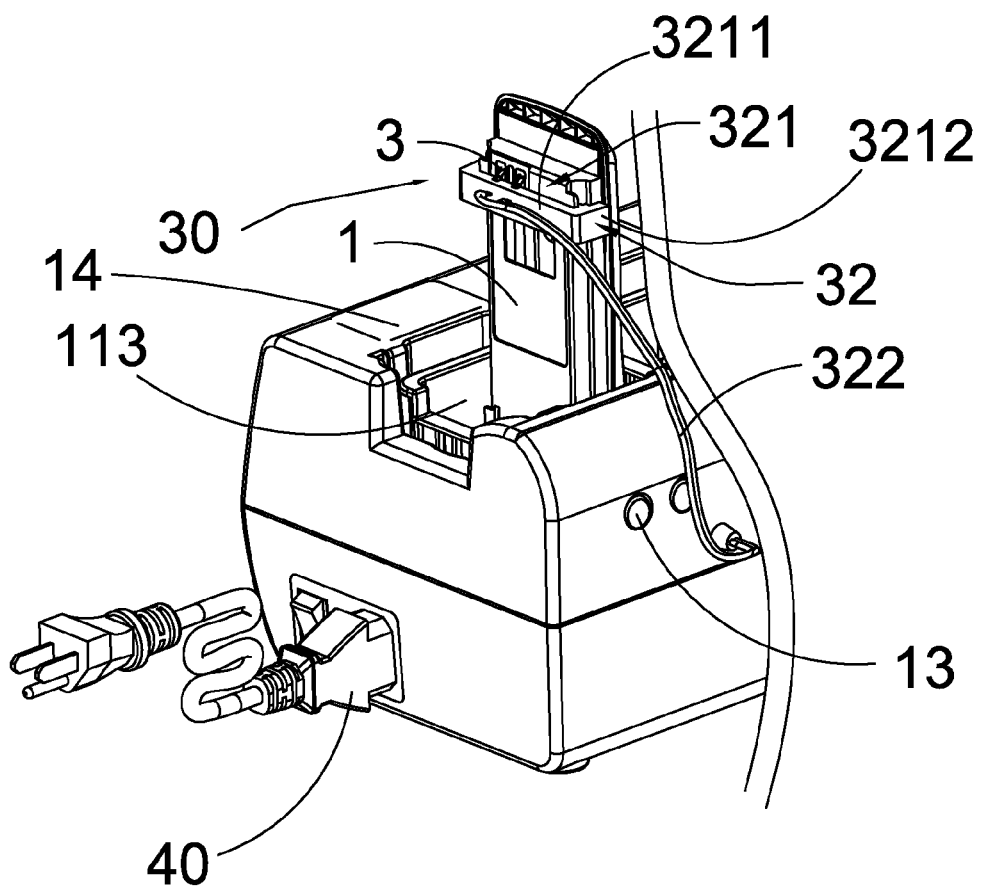
FIG. 5 is a partially perspective view of the charger having the analyzer arrangement according to the preferred embodiment of the present invention.
Figure 6:
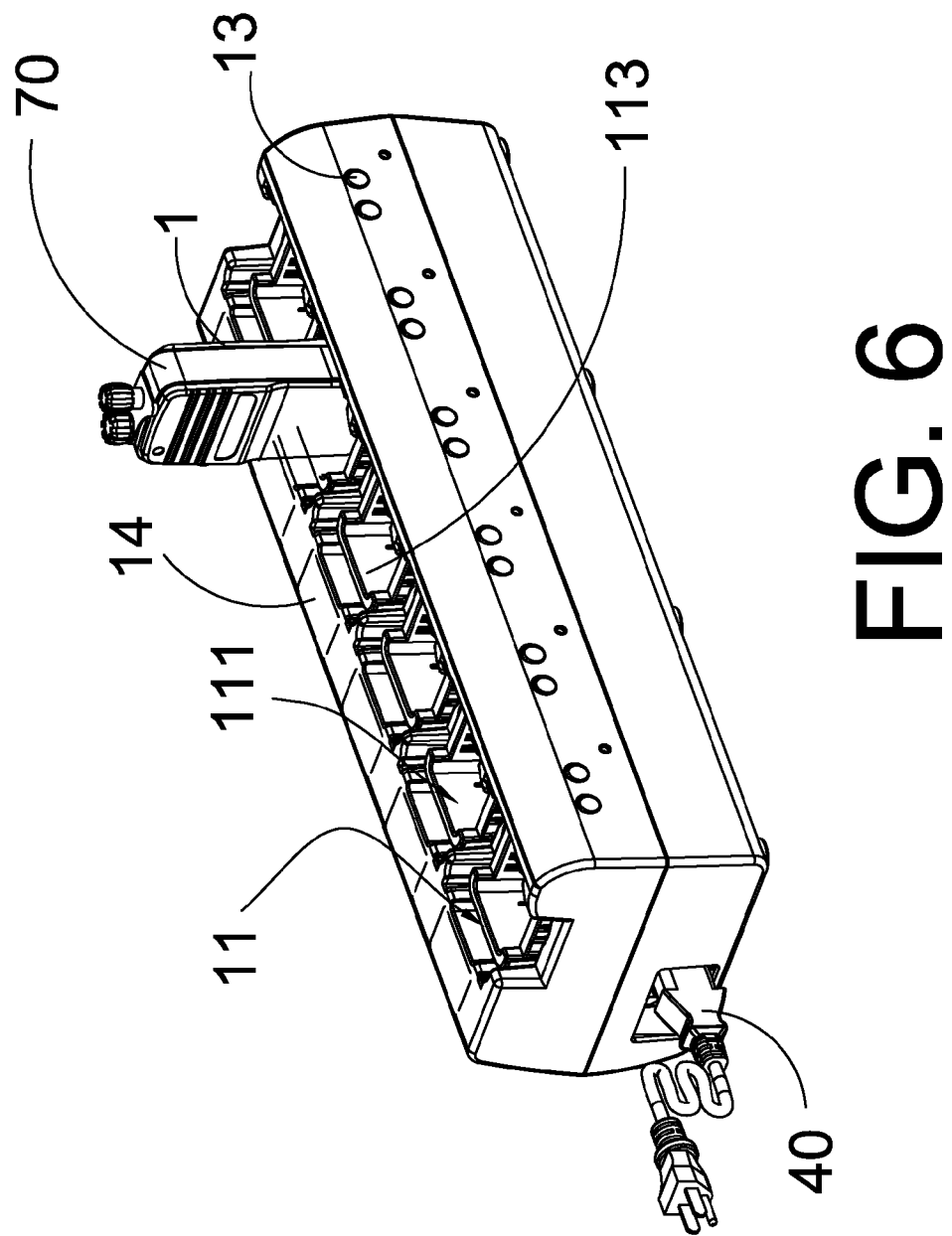
FIG. 6 is a perspective view of the charger having the analyzer arrangement according to the preferred embodiment of the present invention.

In order to facilitate electrical connection between the analyzer connectors 32 and the analyzer circuitry 31, each of the analyzer connectors 32 further comprises a plurality of connector terminals 323 spacedly provided at the connector frame 321 at positions aligning with the battery discharging terminals 3 of the rechargeable battery 1 respectively when the connector frame 321 is detachably attached onto that rechargeable battery 1. As shown in FIG. 3A and FIG. 3B of the drawings, each of the extension cables 322 extends from the charger base 10 to the respective connector terminals 323 for providing a path of electrical connection between the connector terminals 323 of the connector frame 321 and the analyzer circuitry 31.

The analyzer frame 321 of the analyzer connector 32 has an elongated main body 3211 and a plurality of attaching arms 3212 integrally and flexibly extended from two sides of the elongated main body 3211 respectively and adapted for detachably attaching with two predetermined side portions of the rechargeable battery 1 so as to allow the analyzer frame 321 to detachably attach onto the rechargeable battery 1.

More specifically, each of the attaching arms 3212 has a L-shaped cross section extended from the corresponding end portion of the elongated main body 3211 for detachably attached to a corresponding side portion of the rechargeable battery 1. When the attaching arms 3212 is detachably attached onto the side portion of the rechargeable battery 1, the connector terminals 323 are arranged to align with the battery discharging terminals 3 of the rechargeable battery 1 respectively so that the charger of the present invention can function in the analyzer mode and test and discharge the rechargeable battery 1 by the analyzing circuitry 31. Moreover, the analyzing circuitry 31 can also optimally recharge the rechargeable battery 1 by first discharging and testing it.

In order to illustrate the conditions of the rechargeable battery 1, the charger base 10 further comprises a control panel 13 and a plurality of (at least one) display screens 14 provided on the charger base 10 for displaying a charging or discharging status of the rechargeable battery 1. The user may also control the operation of the charger of the present invention by controlling the control panel 13. The display-sub circuitry 23 is arranged to control and provide the information displayed by at least one of the display screens 14.

The operation of the present invention is as follows: in the ordinary course of events, the rechargeable battery 1 is attached onto a rear side of the radio communication device 70 and its user may use the radio communication device 70 in a wide range of circumstances. When the radio communication device 70 runs out of battery, the user may recharge the rechargeable battery 1 simply by disposing the radio communication device 70 and the rechargeable battery 1 (which is still attached onto the radio communication device 70) into one of the receiving racks 113 of the corresponding charging platform 11. The charger of the present invention may use it at the charger mode and recharge the rechargeable battery 1 without using any analyzer function.

However, when the user wishes to test and analyze the rechargeable battery 1, the user may detach the rechargeable battery 1 from the radio communication device 70 and dispose the rechargeable battery 1 into one of the receiving racks 113 in an orientation opposed to that for charging the rechargeable battery 1 at the charger mode. The user may then attach the analyzer connector 32 to the rechargeable battery 1 so as to align the battery discharging terminal 3 with the connector terminals 323. The user may then operate the charger at the analyzer mode and test the rechargeable battery 1 through operation of the control panel 13 and monitor the progress through the corresponding display screen 14.

It is worth mentioning that the charger mode and the analyzer mode is meant to operate exclusively for each of the charging platforms 11. In other words, the user may, in the ordinary course of events, use the radio communication device 70 with the rechargeable battery 1 and recharge it at the charger mode whenever necessary. This saves time and brings extreme convenience to users of the present invention because the user needs only to dispose the entire device (the radio communication device 70 with the rechargeable battery 1) into one of the receiving racks 113.

Since periodic analyzing of the rechargeable battery 1 substantially improves its life span, the user may detach the rechargeable battery 1 periodically (e.g. once a week) to discharge and recharge the rechargeable battery 1 at the analyzer mode. Moreover, the present invention is meant to promote the use of analyzing function with respective to rechargeable battery 1 (i.e. it should no longer be limited for use in professional setting as opposed to domestic setting). As a result, the manufacturing cost and the ultimate selling price of the charger of the present invention can be substantially minimized as opposed to traditional analyzers. It is also important to emphasis that the charger of the present invention can simultaneously recharge or analyze a number of rechargeable batteries 1 so as to facilitate widespread application by institutions which may extensively utilize radio communication devices 70.

Figure 11:
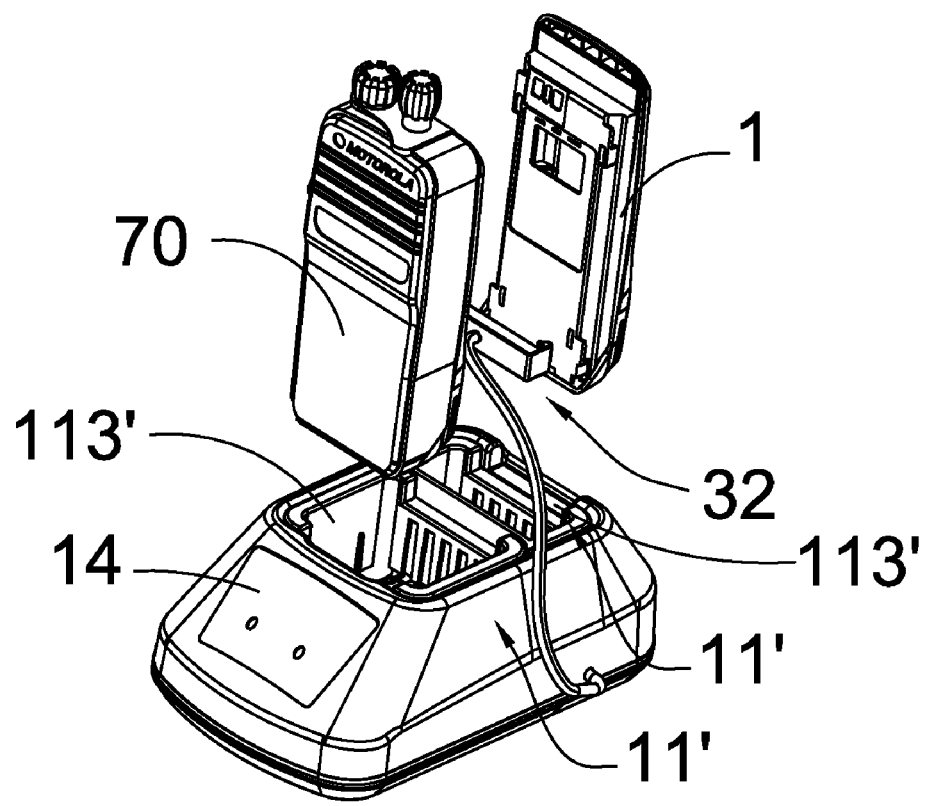
FIG. 11 is an alternative mode of the charger according to the preferred embodiment of the present invention.

Referring to FIG. 11 of the drawings, an alternative mode of the charger according to the preferred embodiment of the present invention is illustrated. The alternative mode is similar to the preferred embodiment mentioned, except the configuration of the receiving racks 113'. According to the alternative mode, at least one of the receiving racks 113' of a corresponding charging platform 11' is arranged to receive only the rechargeable battery 1" without also accommodating the radio communication device 70. As such, the user is able to dispose only the rechargeable battery 1 into one of the receiving racks 113' which is sized and shaped to receive only the rechargeable battery 1. At least one of the analyzer connectors 32' is arranged to facilitate the charger of the present invention to operate in the analyzer mode for the corresponding charging platform 11'. As shown in FIG. 11, the user may now use the charger of the present invention in a more flexible manner because he or she can also be able to dispose solely the rechargeable battery 1 onto at least one of the specifically shaped receiving racks 113' for recharging the rechargeable battery 1.

One skilled in the art will appreciate that the embodiment of the present invention as shown in the drawings and described above is illustrative only and not intended to be limiting. All embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A charger for charging a rechargeable battery having a plurality of battery charging terminals and battery discharging terminals spacedly provided at predetermined positions on said rechargeable battery, wherein said charger comprises:

a charger base which comprises at least one charging platform defining a receiving cavity indently formed thereon for said rechargeable battery to dispose in said receiving cavity, and comprising a plurality of charger charging terminals provided at positions corresponding to said battery charging terminals respectively when said rechargeable battery is disposed in said receiving cavity;

a charging circuitry received in said charger base and electrically connected with said charger charging terminals; and an analyzer arrangement, which comprises an analyzing circuitry received in said charger base; and an analyzer connector provided on said charger base for electrically connecting said battery discharging terminals with said analyzing circuitry, wherein said charging platform is arranged to operate in at least one of a charger mode and an analyzer mode, wherein in said charger mode, said rechargeable battery is arranged to insert in said receiving cavity in such a manner that said battery charging terminals are aligned and electrically contacted with said charger charging terminals respectively for charging said rechargeable battery by said charging circuitry, wherein in said analyzer mode, said rechargeable battery is arranged to insert into said receiving cavity while said analyzer connector is extended from said charger base to electrically contact with said battery discharging terminals for allowing said rechargeable battery to be discharged and analyzed by said analyzing circuitry.

2. The charger, as recited in claim 1, wherein said charging platform further comprises at least one receiving rack provided thereon to define said receiving cavity for accommodating said rechargeable battery, wherein said charger charging terminals are provided on a predetermined position on a sidewall of said receiving cavity of said corresponding receiving rack and aligned with said battery charging terminals of said rechargeable battery respectively.

3. The charger, as recited in claim 1, wherein analyzer connector comprises a connector frame adapted for detachably coupling with a predetermined portion of said corresponding rechargeable battery, and an extension cable extended from said charger base to connect with said corresponding connector frame.

4. The charger, as recited in claim 2, wherein analyzer connector comprises a connector frame adapted for detachably coupling with a predetermined portion of said corresponding rechargeable battery, and an extension cable extended from said charger base to connect with said corresponding connector frame.

5. The charger, as recited in claim 3, wherein said analyzer connectors further comprises a plurality of connector terminals spacedly provided at said connector frame at positions aligning with said battery discharging terminals of said rechargeable battery respectively when said connector frame is detachably attached onto said rechargeable battery so as to allow said charger to operate in said analyzer mode.

6. The charger, as recited in claim 4, wherein said analyzer connectors further comprises a plurality of connector terminals spacedly provided at said connector frame at positions aligning with said battery discharging terminals of said rechargeable battery respectively when said connector frame is detachably attached onto said rechargeable battery so as to allow said charger to operate in said analyzer mode.

7. The charger, as recited in claim 5, wherein each of said extension cables extends from said charger base to said respective connector terminal for providing a path of electrical connection between said connector terminal of said connector frame and said analyzer circuitry.

8. The charger, as recited in claim 6, wherein each of said extension cables extends from said charger base to said respective connector terminal for providing a path of electrical connection between said connector terminal of said connector frame and said analyzer circuitry.

9. The charger, as recited in claim 6, wherein said analyzer frame of said analyzer connector has an elongated main body and a plurality of attaching arms integrally and flexibly extended from two sides of said elongated main body respectively and adapted for detachably attaching with two predetermined side portions of said rechargeable battery so as to allow said analyzer frame to detachably attach onto said rechargeable battery when said charger is in said analyzer mode, wherein said connector terminals are provided on said elongated main body for electrically connecting with said battery discharging terminals of said rechargeable battery.

10. The charger, as recited in claim 7, wherein said analyzer frame of said analyzer connector has an elongated main body and a plurality of attaching arms integrally and flexibly extended from two sides of said elongated main body respectively and adapted for detachably attaching with two predetermined side portions of said rechargeable battery so as to allow said analyzer frame to detachably attach onto said rechargeable battery when said charger is in said analyzer mode, wherein said connector terminals are provided on said elongated main body for electrically connecting with said battery discharging terminals of said rechargeable battery.

11. The charger, as recited in claim 8, wherein said analyzer frame of said analyzer connector has an elongated main body and a plurality of attaching arms integrally and flexibly extended from two sides of said elongated main body respectively and adapted for detachably attaching with two predetermined side portions of said rechargeable battery so as to allow said analyzer frame to detachably attach onto said rechargeable battery when said charger is in said analyzer mode, wherein said connector terminals are provided on said elongated main body for electrically connecting with said battery discharging terminals of said rechargeable battery.

12. The charger, as recited in claim 9, wherein each of said attaching arms has a L-shaped cross section extended from said corresponding end portion of said elongated main body for detachably attaching to a corresponding side portion of said rechargeable battery, such that when said attaching arms is detachably attached onto said side portion of said rechargeable battery, said connector terminals are arranged to align with said battery discharging terminals of said rechargeable battery respectively so that said charger.

13. The charger, as recited in claim 10, wherein each of said attaching arms has a L-shaped cross section extended from said corresponding end portion of said elongated main body for detachably attaching to a corresponding side portion of said rechargeable battery, such that when said attaching arms is detachably attached onto said side portion of said rechargeable battery, said connector terminals are arranged to align with said battery discharging terminals of said rechargeable battery respectively so that said charger.

14. The charger, as recited in claim 11, wherein each of said attaching arms has a L-shaped cross section extended from said corresponding end portion of said elongated main body for detachably attaching to a corresponding side portion of said rechargeable battery, such that when said attaching arms is detachably attached onto said side portion of said rechargeable battery, said connector terminals are arranged to align with said battery discharging terminals of said rechargeable battery respectively so that said charger.

15. The charger, as recited in claim 12, wherein said charging circuitry comprises a recharging sub-circuitry, and a control sub-circuitry received in said charger base for recharging said rechargeable battery and controlling an operation thereof, wherein said analyzing circuitry is also electrically connected with said control sub-circuitry for coordinating recharging and discharging of said rechargeable battery.

16. The charger, as recited in claim 13, wherein said charging circuitry comprises a recharging sub-circuitry, and a control sub-circuitry received in said charger base for recharging said rechargeable battery and controlling an operation thereof, wherein said analyzing circuitry is also electrically connected with said control sub-circuitry for coordinating recharging and discharging of said rechargeable battery.

17. The charger, as recited in claim 14, wherein said charging circuitry comprises a recharging sub-circuitry, and a control sub-circuitry received in said charger base for recharging said rechargeable battery and controlling an operation thereof, wherein said analyzing circuitry is also electrically connected with said control sub-circuitry for coordinating recharging and discharging of said rechargeable battery.

18. The charger, as recited in claim 1, wherein said charger base further comprises a control panel and at least one display screen provided on said charger base for displaying a charging and discharging status of said rechargeable battery.

19. The charger, as recited in claim 6, wherein said charger base further comprises a control panel and at least one display screen provided on said charger base for displaying a charging and discharging status of said rechargeable battery.

20. The charger, as recited in claim 14, wherein said charger base further comprises a control panel and at least one display screen provided on said charger base for displaying a charging and discharging status of said rechargeable battery.

21. The charger, as recited in claim 17, wherein said charger base further comprises a control panel and at least one display screen provided on said charger base for displaying a charging and discharging status of said rechargeable battery.

22. The charger, as recited in claim 14, wherein said charger base further comprises a plurality of charging platforms for receiving a plurality of rechargeable batteries respectively, wherein said charger base has an elongated structure accommodating said charging platforms, and a correspondingly elongated accommodating slot transversely and indently formed on said charger base, wherein said charger platforms are fittedly received in said accommodating slots in a side-by-side manner.

23. The charger, as recited in claim 17, wherein said charger base further comprises a plurality of charging platforms for receiving a plurality of rechargeable batteries respectively, wherein said charger base has an elongated structure accommodating said charging platforms, and a correspondingly elongated accommodating slot transversely and indently formed on said charger base, wherein said charger platforms are fittedly received in said accommodating slots in a side-by-side manner.

24. The charger, as recited in claim 21, wherein said charger base further comprises a plurality of charging platforms for receiving a plurality of rechargeable batteries respectively, wherein said charger base has an elongated structure accommodating said charging platforms, and a correspondingly elongated accommodating slot transversely and indently formed on said charger base, wherein said charger platforms are fittedly received in said accommodating slots in a side-by-side manner.

25. The charger, as recited in claim 24, wherein at least one of said receiving racks is shaped and sized to receive solely said rechargeable battery for recharging thereof when said respective charging platform is operated at said charger mode, and for discharging of said rechargeable battery when said corresponding charging platform is operated at said analyzer mode.

* * * * *